United States Patent
Asprey

(10) Patent No.: US 6,377,542 B1
(45) Date of Patent: *Apr. 23, 2002

(54) RAP ALTERNATE ROUTEING FOR ISO 10589

(75) Inventor: Martin J Asprey, Plungar (GB)

(73) Assignee: Marconi Communications Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,618

(22) Filed: Mar. 18, 1998

(30) Foreign Application Priority Data

Jul. 31, 1997 (GB) .............................. 9716198

(51) Int. Cl.⁷ .................. G01R 31/08; G06F 11/00; G08C 15/00; H04J 1/16; H04J 3/14
(52) U.S. Cl. ........................ 370/222; 370/406
(58) Field of Search ................. 370/221, 222, 370/223, 224, 249, 389, 400, 406, 217, 228

(56) References Cited

U.S. PATENT DOCUMENTS

| | | | |
|---|---|---|---|
| 5,262,906 A | 11/1993 | Mazzola | |
| 5,307,353 A * | 4/1994 | Yamashita et al. | 714/4 |
| 5,430,727 A | 7/1995 | Callon | |
| 5,440,540 A * | 8/1995 | Kremer | 370/223 |
| 5,497,368 A * | 3/1996 | Reijnierse et al. | 370/351 |
| 5,557,745 A * | 9/1996 | Perlman et al. | 709/242 |
| 5,717,687 A * | 2/1998 | Minot et al. | 370/257 |
| 5,719,861 A * | 2/1998 | Okanoue | 370/351 |
| 5,793,765 A * | 8/1998 | Boer et al. | 370/395 |
| 5,856,974 A * | 1/1999 | Gervais et al. | 370/392 |

* cited by examiner

*Primary Examiner*—David R. Vincent
*Assistant Examiner*—Bob A. Phunkulh
(74) *Attorney, Agent, or Firm*—Kirschstein, et al.

(57) ABSTRACT

In a Synchronous Digital Hierarchy (SDH) based communications network comprising a plurality of Intermediate Systems (IS), the IS being divided between at least one IS—IS Area and at least one non-IS—IS Area, an IS—IS Area being an area with which a routeing protocol forming part of the Network Layer (Layer 3) of the Open Systems Interconnection including routeing (OSI), is provided for routeing messages between areas, whereby where a message is routed from an IS—IS Area to a destination IS within a non-IS—IS Area and the connection to the destination IS is broken, and as a result a message is returned from the non-IS—IS Area to the originating IS—IS Area connection to the destination IS is made by a second choice connection.

2 Claims, 2 Drawing Sheets

Legend

∽ NPDU Path
ⓧ NE Node x
✕ Link Break
◯ Routeing Domain

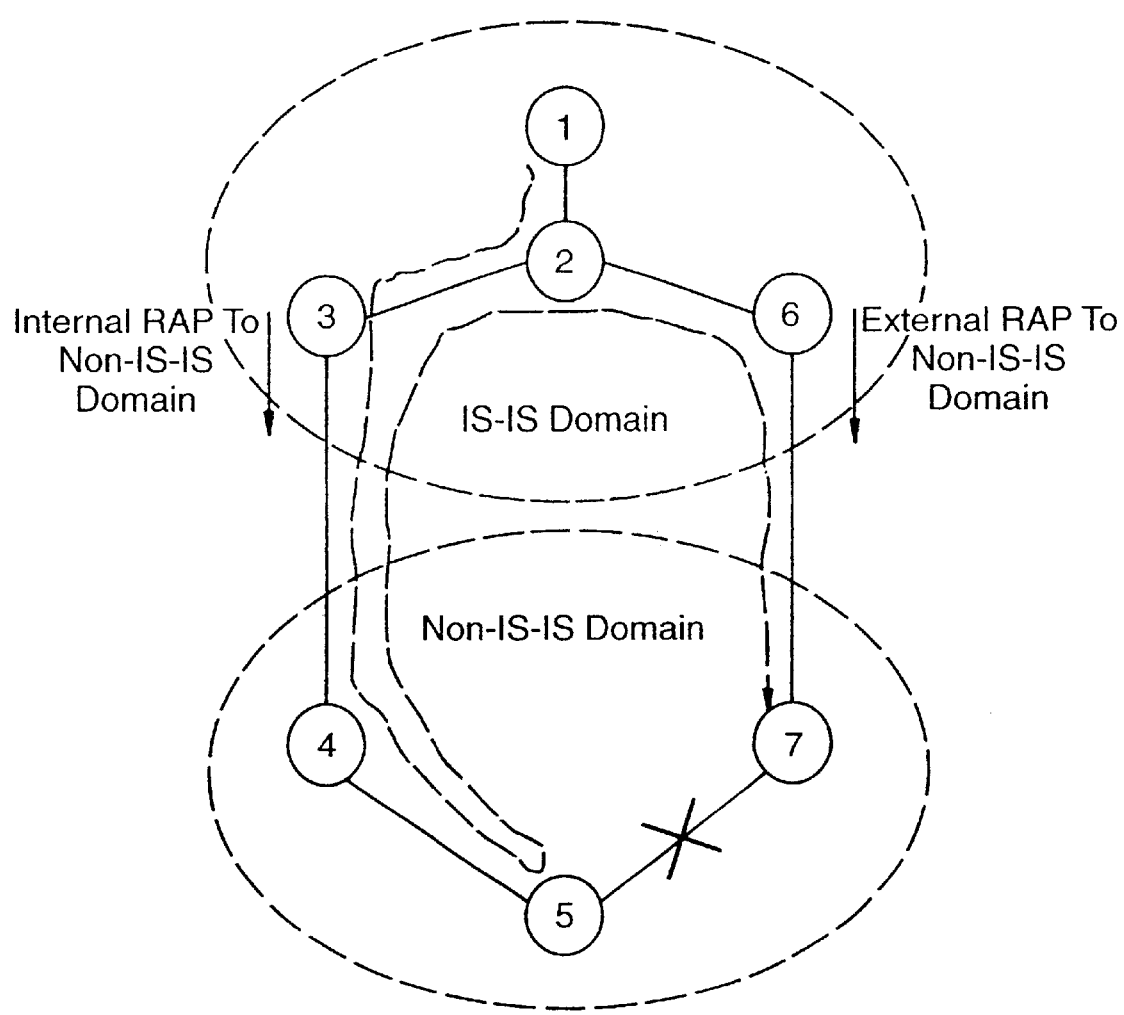

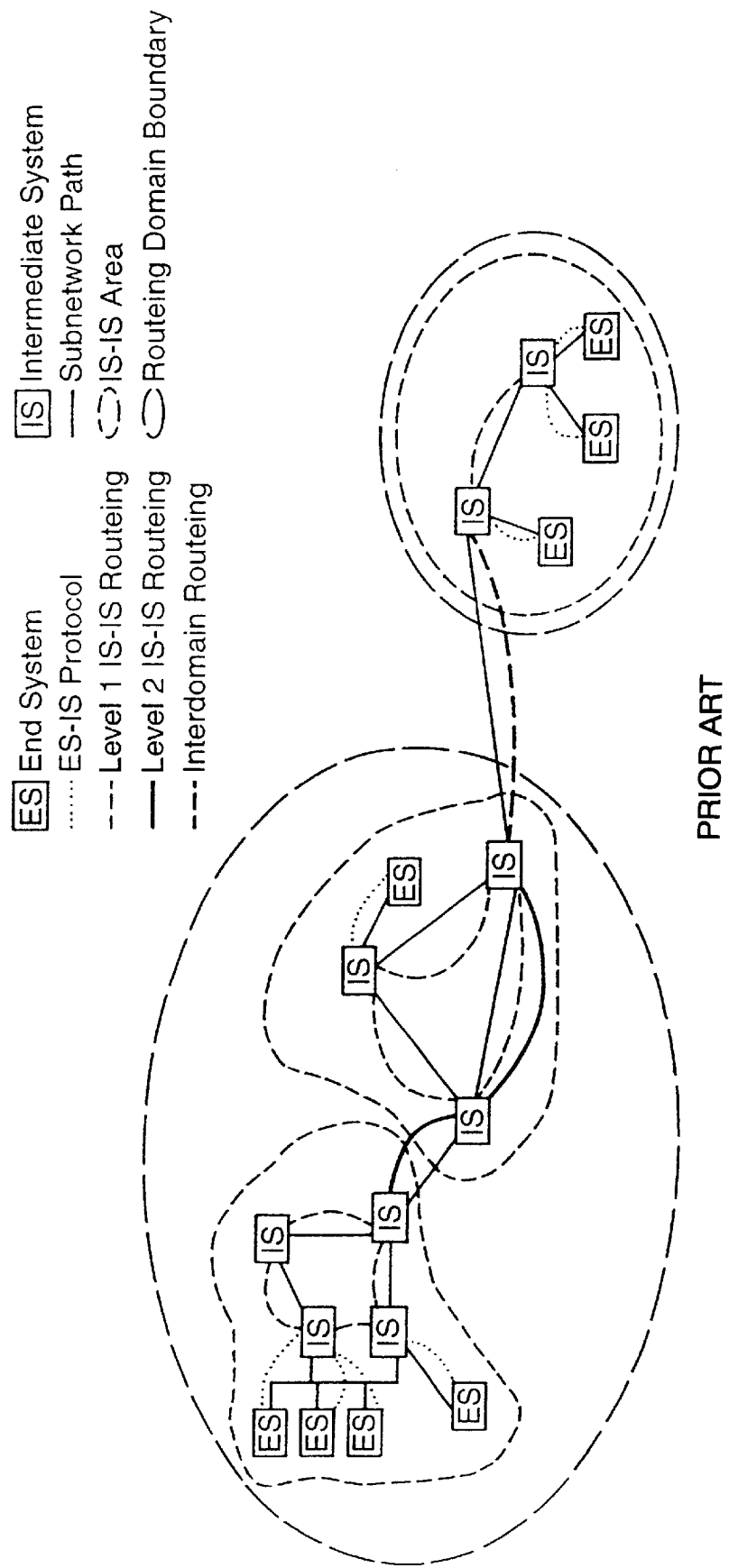

RAP ALTERNATE ROUTEING FOR ISO 10589

BACKGROUND OF THE INVENTION

Field of the Invention

Synchronous Digital Hierarchy (SDH) equipment is the latest generation of equipment that is used to provide high bandwidth communications capabilities for use between telephone exchanges and in other areas where high quality telecomms is required (broadcast video distribution, etc). Embedded within the traffic 'traffic' carrying capability of the equipment are data communications channels (DCCs). These channels constitute a datacomms network that uses OSI protocols.

Each piece of equipment constitutes a routeing node in the datacomms network formed by the data channels, and can operate any one of a number of different routeing methods. The present invention is concerned with the interworking of two of the possible routeing methods.

The two routeing methods that will commonly occur in SDH networks are IS—IS (ISO 10589) and quasi-static routeing (where alternate routes may be chosen on link failure). Where this occurs, routeing loops, causing loss of communications can be caused. The present invention detects the formation of a routeing loop and changes the behavior of the IS—IS node accordingly.

The IS—IS routeing protocol is one of a set of 'link state' dynamic routeing protocols. These protocols automatically distribute routeing information round the datacomms network, allowing nodes to learn the required routeing information from the actual network. This provides the ability to automatically reconfigure, allowing routeing round network faults, in case of network link failure.

The IS—IS routeing protocol has two routeing levels, Level-1 and Level-2. See FIG. 2 (from ISO 10589) for the use of these levels and the general environment of this protocol and the topologies and systems supported by Intra-domain Routeing.

The present invention is also applicable to other datacomms scenarios, where a dynamic routeing protocol is interworked with static routeing, or a different dynamic protocol (e.g. OSPF and static routes, etc).

SUMMARY OF INVENTION

According to the present invention there is provided a Synchronous Digital Hierarchy (SDH) based communications network comprising a plurality of Intermediate Systems (IS), the ISs being divided between at least one IS—IS Area and at least one non-IS—IS Area, an IS—IS Area being an area with which a routeing protocol forming part of the Network Layer (Layer 3) of the Open Systems Interconnection including routeing (OIS), is provided for routeing messages between areas, including routeing means, whereby where a message is routed from an IS—IS Area to a destination IS within a non-IS—IS Area and the connection to the destination IS is broken, and as a result a message is returned from the non-IS—IS Area to the originating IS—IS Area connection to the destination IS is made by a second choice connection.

There is further provided a method for use in Synchronous Digital Hierarchy (SDH) based communications network comprising a plurality of Intermediate Systems (IS), the IS being divided between at least one IS—IS Area and at least one non-IS—IS Area, wherein when a message is returned from the non-IS—IS Area to the originating IS—IS Area a second choice connection to the destination IS is made.

BRIEF DESCRIPTION OF THE DRAWINGS

The invention will now be described by way of example, with reference to the accompanying drawings, in which;

FIG. 1 is a routeing diagram illustrating the invention; and

FIG. 2 illustrates the ISO 10589 Level 1 and Level 2 IS—IS routeing protocols.

DETAILED DESCRIPTION OF THE DRAWINGS

References

[1] ISO/IEC 10589: 1992 (E)

Information technology—Telecommnunications and information exchange between systems—Intermediate systems to Intermediate system intra-domain routeing information exchange for use in conjunction with the protocol for providing the connectionless-mode Network Service (ISO 8473).

Glossary:

Area—An IS—IS Level routeing subdomain

ES—End System—These systems deliver NPDUs to other systems and receive NPDUs from other systems, but do not relay NPDUs External RAP Route A RAP Route derived from a RAP with metric type External Internal RAP Route A RAP Route derived from a RAP with a metric type Internal IS—Intermediate System (a node where data may be routed on to another IS or to an End System (ES))

IS—IS—The IS to IS intra-domain routeing protocol as specified in ISO 10589.

NE—Network Element

NPDU—Network Layer Protocol Data Unit

NSAP—Network Service Access Point

OSI—Open Systems Interconnection

RAP—Reachable Address Prefix

RAP Route Route derived from a RAP (regardless of whether the RAP is configured locally or on a remote Router)

Router An IS running IS—IS

Level 1 Intermediate Systems deliver and receive NPDUs from other systems, and relay NPDUs from other source systems to other designation systems. They route directly to systems within their own area, and route towards a Level 2 Intermediate system when the destination system is in a different area.

Level 2 Intermediate Systems act as Level 1 Intermediate systems in addition to acting as a system in the subdomain consisting of Level 2 ISs. Systems in the Level 2 subdomain route towards a destination area, or another routeing domain. References to the routeing of NPDUs are made with regard to NPDUs destined for NSAPs residing on NEs in the non-IS—IS subdomain.

References to routeing over RAP Routes (whether Internal or External) pertain to routeing NPDUs, where the Address Prefix associated with the RAP Route is a prefix of the destination NSAP of the NPDU.

Knowledge of reference ISO 10589 is assumed and reference is made to terms defined in it. The RAP Alternate Routeing is an extension to IS—IS and resolves a problem when interworking with non-IS—IS. Although the present invention was born out of an IS—IS problem, it may have applications in other dynamic routeing protocols which use and discriminate between static route entries when interworking with other routeing protocols, whether dynamic, static or quasi-static.

IS—IS is a dynamic, link state based, routeing protocol which can be included as part of the Network Layer (layer 3) of the OSI Reference Model. For the purpose of this document, ISs running IS—IS will be termed Routers.

Routers can participate in two levels or routeing:
i) Level 1—For routeing within an Area
ii) Level 2—For routeing between Areas Level 2 Routers provide the ability to enter static routes to NEs (and subdomains of NEs) which do not support IS—IS. These static routes are termed Reachable Address Prefixes (RAP) and they can have a metric type of either Internal or External. A level 2 Router, with a configured RAP, propagates the details of the RAP within it's Level 2 link state information. Thus all Level 2 Routers gain information about all RAPs configured with the Level 2 subdomain and calculate routes (RAP Routes) accordingly. When routeing decisions are made, Internal RAP Routes are selected in preference to External RAP Routes.

Since the NEs within the non-IS—IS subdomain do not propagate ISO 10589 link state information, the Routers cannot determine the state of routes beyond the boundary of the IS—IS subdomain. This means there is no way to monitor complete end-to-end routes which terminate in, or are routed through, the non-IS—IS subdomain.

There are two problems with this situation:
i) The inability to provide a second (back-up) route for resilience;
ii) The possibility of forming routeing loops when certain links in the non-IS—IS subdomain break (i.e. a Router may route NPDUs into the non-IS—IS subdomain and the non-IS—IS NEs may route the NPDUs back into the IS—IS subdomain).

RAP Alternate Routeing provides resilience when RAPs are used in a mixed routeing environment (i.e. to provide routes into non-IS—IS subdomains) by enabling automatic control of a second choice static route to non-IS—IS equipment. This makes uses of the two different metric types possible with RAPs (Internal and External) and will require one of each to be configured within the IS—IS subdomain.

The two problems i) and ii) above can be solved by selecting External RAP Routes when an NPDU is received on an Internal RAP Route and the originally selected outgoing route is an Internal RAP Route. By performing this function, Internal RAP Routes can be viewed as primary RAP Routes and External RAP Routes as secondary RAP Routes. Provision of this secondary route can provide resilience and can avoid routeing loops if the RAPs are configured correctly. A more detailed explanation is given below.

When a message (NPDU) is received on a circuit C associated with an Internal RAP Route and the selected outgoing route is an Internal RAP Route, the Routeing Table is searched for another RAP Route (i.e. a RAP Route other than the Internal RAP Route associated with circuit C). The two Internal RAP Routes can be different if the IS—IS parameter maximum Path Splits is set to 2. External RAP Routes are selected in preference to Internal RAP Routes. If no other RAP Route exists then the original RAP Route is selected (an NPDU forwarded on this route will probably loop and timeout in the network). The message is then forwarded on the circuit associated with the selected route.

This mechanism provides alternate routeing on a packed-by-packet basis. It does not change the state of the RAPs and hence does not advertise the fact that an alternate route has been used to the rest of the network. As soon as the non-IS—IS subdomain is repaired (i.e. it does not route NPDUs back into the IS—IS subdomain), the RAP Alternate Routeing will cease to be invoked, so the best available route will always be used.

As an example, referring to FIG. 1, an NPDU from node 1 and destined for node 7 will be routed to node 2, on to node 3 and on to node 4 (since 3 has an Internal RAP to the non-IS—IS Routeing Domain).

It is necessary to make assumptions about the routeing in the non-IS—IS domain It is assumed that node 4 will route the NPDU to node 5 and that node 5 has no choice (because the link between nodes 5 and 7 is broken) and so routes the NPDU back to node 4. Also assume that node 4, now realizing that a route to node 7 via node 5 does not exist, routes the NPDU back to node 3.

The actual mechanism of the routeing within the non-IS—IS domain is not significant, the key to invoking the RAP Alternate Routeing is that an NPDU, destined for the non-IS—IS domain, returns to the IS—IS domain on a link, where a RAP to the non-IS—IS domain is configured.

The original IS—IS protocol will force node 3 to route the NPDU back into the non-IS—IS domain via node 4. At this point a probable routeing loop has occurred and the NPDU will expire (due to lifetime decay) within the network.

With RAP Alternate Routeing node 3 will detect that it is receiving a NPDU on a link which it should use to route the packet. It will detect that this link is an Internal RAP Route for the non-IS—IS domain and will invoke RAP Alternate Routeing. Node 3 will then route the NPDU to node 2 (i.e. on the External RAP Route).

Node 2 will receive the NPDU on an Internal RAP Route and will route the NPDU to 6(i.e. on External RAP Route).

Node 6 will receive the NPDU on an Internal RAP Route and will route the NPDU to 7(i.e. on the External RAP Route).

Node 7 is the destination for the NPDU. Thus the routeing loop described above has been avoided and the NPDU has reached its destination.

What I claim is:

1. A synchronous digital hierarchy (SDH) based communications network, comprising:
   a) a plurality of data communications channels embedded within the communications network;
   b) a plurality of intermediate systems (IS) divided between at least one IS—IS area and at least one non-IS—IS area, said at least one IS—IS area being an area within which a routing protocol, that forms a part of a network layer of an open systems interconnection (OSI), is provided for routing messages between the areas;
   c) a plurality of connections between said at least one IS—IS area and said at least one non-IS—IS area, the plurality of connections including at least one internal reachable address prefix (RAP) route and at least one external RAP route; and
   d) means for routing a message from an originating IS—IS area to a destination IS within said at least one non-IS—IS area via said at least one internal RAP route when one of the connections to the destination IS is broken within said at least one non-IS—IS area, to cause the message to be returned from said at least one non-IS—IS area to the originating IS—IS area via said at least one internal RAP route, by making another connection to the destination IS by a further one of the plurality of connections between the originating IS—IS area and said at least one non-IS—IS area via said at least one external RAP route.

2. A method of routing messages in a synchronous digital hierarchy (SDH) based communications network, comprising the steps of:

a) embedding a plurality of data communications channels within the communications network;

b) dividing a plurality of intermediate systems (IS) between at least one IS—IS area and at least one non-IS—IS area, said at least one IS—IS area being an area within which a routing protocol, that forms a part of a network layer of an open systems interconnection (OSI), is provided for routing the messages between the areas;

c) providing a plurality of connections between said at least one IS—IS area and said at least one non-IS—IS area, the plurality of connections including at least one internal reachable address prefix (RAP) route and at least one external RAP route; and d) routing a message from an originating IS—IS area to a destination IS within said at least one non-IS—IS area via said at least one internal RAP route when one of the connections to the destination IS is broken within said at least one non-IS—IS area, to cause the message to be returned from said at least one non-IS—IS area to the originating IS—IS area via said at least one internal RAP route, by making another connection to the destination IS by a further one of the plurality of connections between the originating IS—IS area and said at least one non-IS—IS area via said at least one external RAP route.

* * * * *